Figure 1:
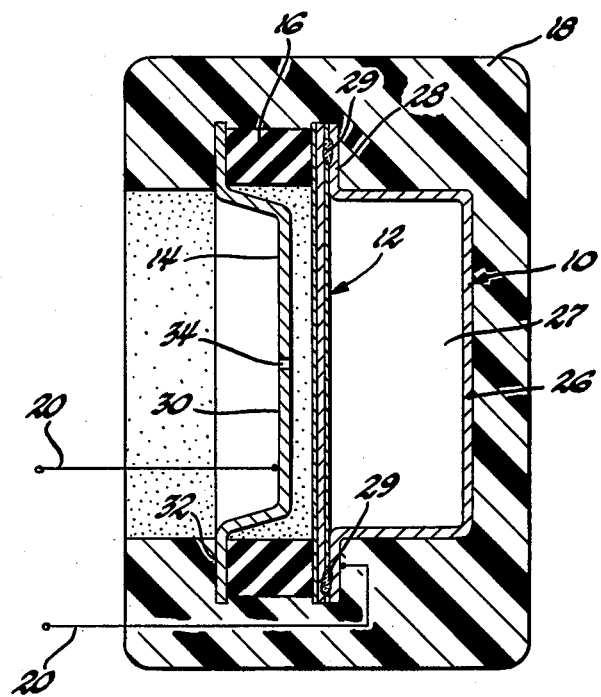

United States Patent [19]

Mann

[11] 4,198,670

[45] Apr. 15, 1980

[54] CAPACITIVE PRESSURE TRANSDUCER

[75] Inventor: Gamdur S. Mann, Flint, Mich.

[73] Assignee: General Motors Corporation, Detroit, Mich.

[21] Appl. No.: 961,995

[22] Filed: Nov. 20, 1978

[51] Int. Cl.² .......................... H01G 7/00; G01L 9/12
[52] U.S. Cl. .................................... 361/283; 361/278
[58] Field of Search .................. 361/278, 283; 73/718, 73/724

[56] References Cited

U.S. PATENT DOCUMENTS

| | | | |
|---|---|---|---|
| 2,667,786 | 2/1954 | Spaulding | 361/283 X |
| 2,808,545 | 10/1957 | Hirtreiter | 361/283 X |
| 3,027,769 | 4/1962 | Coon | 361/283 X |
| 3,697,835 | 10/1972 | Satori | 361/283 |

FOREIGN PATENT DOCUMENTS 845404 8/1960 United Kingdom ..................... 561/278

*Primary Examiner*—E. A. Goldberg
*Attorney, Agent, or Firm*—Warren D. Hill

[57] ABSTRACT

A variable capacitor includes a metal diaphragm arranged to flex in response to an applied pressure differential serving as a movable capacitor plate and a fixed capacitor plate closely spaced from the diaphragm. At least one of the two capacitor plates has an insulating layer of metal oxide formed thereon to prevent electrical contact therebetween. By making the capacitor plate of an iron-chrome-aluminum alloy and heating the capacitor plate, an aluminum oxide layer is formed thereon. The fixed capacitor plate is formed in a hat-shaped configuration with the brim portion spaced far from the diaphragm by an insulating spacer to minimize the fixed capacitance around the edge of the capacitor assembly.

3 Claims, 2 Drawing Figures

U.S. Patent        Apr. 15, 1980        4,198,670

CAPACITIVE PRESSURE TRANSDUCER

This invention relates to a capacitive pressure transducer of a type used to modify an electrical quantity in response to an applied fluid pressure.

It is well known to use variable capacitance transducers to sense fluid pressure where it is necessary to provide high quality transducers which are both rugged and accurate. The previously known transducers have been manufactured of expensive exotic materials and fabricated by expensive processes. For example, thin, ceramic or semiconductor materials which are brittle and which require special handling are often utilized in pressure transducers. In addition, glass seals are sometimes used in fabricating such devices.

It is, therefore, a general object of this invention to provide a pressure transducer using relatively inexpensive materials and commonplace manufacturing techniques.

The invention is carried out by a flexible pressure responsive diaphragm forming one plate of a capacitor and spaced from a fixed capacitor plate by a peripheral spacer. The fixed plate is hat-shaped so that the peripheral portion can be widely spaced from the diaphragm while the central portion is closely spaced from the diaphragm and wherein at least one of the capacitor plates is provided with an insulating oxide coating.

Figure 2:
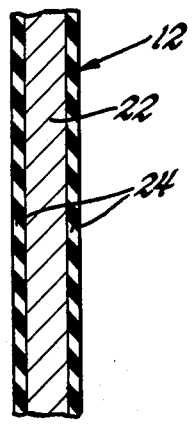

The above and other advantages will be made more apparent from the following specification taken in conjunction with the accompanying drawings wherein like reference numerals refer to like parts and wherein:

FIG. 1 is a cross-sectional view of a pressure transducer according to the invention, and FIG. 2 is an enlarged cross-sectional view of the diaphragm of FIG. 1.

FIG. 1 illustrates a pressure transducer having as its main elements a cup-shaped support member 10, a flexible diaphragm 12 secured to the support 10 to form a movable capacitor plate assembly, and a fixed capacitor plate 14 generally parallel to and spaced from the diaphragm 12 by an annular spacer 16. As illustrated schematically, electrical conductors 20 connected to the movable capacitor plate assembly and the fixed capacitor plate provide the electrical leads of the transducer. The entire transducer except for a portion of the stationary capacitor plate 14 is encapsulated in a molded plastic housing 18. To prevent electrical contact between the two capacitor plates 12, 14, one of them is provided with an insulating oxide coating.

In the specific embodiment presented herein and illustrated in FIG. 2, the diaphragm 12 is fabricated of an Fe-Cr-Al alloy 22 which can be preoxidized at high temperatures to form aluminum oxide scale 24 on its surface. The scale is both adherent and electrically insulating. Thus, the scale does not separate from the diaphragm due to flexing. Specifically, a diaphragm comprising an alloy of an iron base and containing chromium 10.5 to 11 percent, aluminum 4.5 percent, and yttrium 0.3 percent is cleaned and then preoxidized at approximately 1200° C. for one half hour to form a sound insulating aluminum oxide scale of about 10 microns thickness. Alternatively, the fixed capacitor plate could be formed of that alloy and oxidized.

The support member 10 is formed in a cup shape having a deep drawn portion 26 and a radially outwardly extending flange 28 of an iron base material which may be a chrome plated carbon steel or ferritic stainless steel. The diaphragm 12 is welded at its periphery to the flange 28 to provide a sealed chamber between the diaphragm and the support 10. The weld 29 is conveniently formed by laser welding or electron beam welding in a vacuum so that the enclosed chamber 27 will be evacuated to enable the use of the device as an absolute pressure transducer. In the event some other reference pressure is desired, the assembly and welding of the diaphragm and support are carried out at the desired pressure. The fixed capacitor plate 14 is preferably made of nickel or chrome plated carbon steel or copper or stainless steel and is hat-shaped and comprises a central circular portion 30 closely spaced from the diaphragm 12 and an annular peripheral portion 32 widely spaced from the diaphragm 12. The insulating spacer 16 is of rectangular or round section formed of rubber or nylon, for example. A small vent hole 34 in the fixed capacitor plate 14 allows the pressure being measured to be admitted to the space between the capacitor plates so that the pressure differential across the diaphragm 12 will be established by the reference pressure within the sealed chamber and the pressure being measured. That pressure differential causes flexing of the diaphragm and establishes the spacing between the capacitor plates 12 and 14. Thus, as shown, the transducer responds to the pressure of the environment in which it is situated.

Since the periphery of the diaphragm 12 welded to the support 10 does not move in response to pressure variations, its relationship to the fixed capacitor plate results in a fixed capacitance. It is desirable to minimize the fixed capacitance since this contributes to the total capacitance of the transducer yet it contributes nothing to the change in capacitance in response to pressure. For this reason, the fixed capacitor plate is formed in the hat shape so that the peripheral portion 32 is widely spaced from the diaphragm 12 periphery to make the fixed capacitance very small.

As a specific example, the full diameters of the diaphragm 12 and the plate 14 are both 1.25 inches, the diameter of the central portion 30 is 1 inch, the spacing between the central portion 30 and the diaphragm 12 is 0.005 inch (with no pressure differential across the diaphragm) and the spacing between the peripheral portion 32 and the diaphragm is 0.115 inch.

It will be seen that the transducer according to this invention is formed of materials which are easily handled and are not brittle and which are easily fabricated by common manufacturing methods.

The embodiments of the invention in which an exclusive property or privilege is claimed are defined as follows:

1. A capacitive pressure transducer comprising
   a pressure responsive movable capacitor plate assembly including a metal diaphragm attached to support means at its periphery,
   a fixed hat-shaped capacitor plate having a central surface closely spaced from the diaphragm to form with said diaphragm a capacitor of substantial value which is variable according to the position of the diaphragm and further having a peripheral surface widely spaced from the said support means to form a capacitor of fixed capacitance which is small relative to the said variable capacitance,
   an insulating layer of metal oxide formed on at least one of the diaphragms and the fixed capacitor plate for preventing electrical contact therebetween, an insulating spacer between the peripheral surface of the fixed capacitor plate and the said assembly, conductive leads connected to the fixed capacitor plate and the movable capacitor plate assembly, and means for applying a pressure differential across the diaphragm whereby when pressure is applied the diaphragm flexes to vary the capacitance according to the value of the pressure differential.

2. A capacitive pressure transducer comprising a pressure responsive movable capacitor plate assembly including a metal diaphragm welded to metal support means at its periphery, the diaphragm comprising an iron-chromium-aluminum alloy with its surface oxidized to form thereon an insulating coating of aluminum oxide, a fixed hat-shaped capacitor plate having a central surface closely spaced from the diaphragm to form with said diaphragm a capacitor of substantial value which is variable according to the position of the diaphragm and protected from electrical contact therewith by the said insulating oxide coating, the fixed capacitor plate further having a peripheral surface widely spaced from the said support means to form a capacitor of fixed capacitance which is small relative to the said variable capacitance, an insulating spacer between the peripheral surface of the fixed capacitor plate and the said assembly, conductive leads connected to the fixed capacitor plate and the movable capacitor plate assembly, and means for applying a pressure differential across the diaphragm whereby when pressure is applied the diaphragm flexes to vary the capacitance according to the value of the pressure differential.

3. A capacitive pressure transducer comprising cup-shaped support means having an annular rim about its opening a pressure responsive movable capacitor plate assembly including the said support means and a metal diaphragm attached and sealed to the annular rim of the support means to define a closed chamber, a gas within the closed chamber at a preset reference pressure, the diaphragm having an insulating layer of metal oxide formed on the surface thereof, a fixed hat-shaped capacitor plate mounted outside the closed chamber and having a central surface closely spaced from the diaphragm to form with said diaphragm a capacitor of substantial value which is variable according to the position of the diaphragm and protected from electrical contact therewith by the said insulating oxide layer, the fixed capacitor plate further having a peripheral surface widely spaced from the said support means to form a capacitor of fixed capacitance which is small relative to the said variable capacitance, an insulating spacer between the peripheral surface of the fixed capacitor plate and the said assembly, conductive leads connected to the fixed capacitor plate and the movable capacitor plate assembly, and means for applying a pressure on the diaphragm outside the closed chamber whereby when pressure is applied the diaphragm flexes to vary the capacitance according to the value of the applied pressure.

* * * * *